United States Patent
Fang

(10) Patent No.: US 7,907,234 B2
(45) Date of Patent: Mar. 15, 2011

(54) BACKLIGHT MODULE WITH OPTICAL FILM PROTECTOR AND LIQUID CRYSTAL DISPLAY DEVICE USING SAME

(75) Inventor: Chien-Chung Fang, Miao-Li (TW)

(73) Assignee: Chimei Innolux Corporation, Miao-Li County (TW)

( * ) Notice: Subject to any disclaimer, the term of this patent is extended or adjusted under 35 U.S.C. 154(b) by 649 days.

(21) Appl. No.: 11/978,397

(22) Filed: Oct. 29, 2007

(65) Prior Publication Data

US 2008/0174720 A1 Jul. 24, 2008

(30) Foreign Application Priority Data

Oct. 27, 2006 (TW) .............................. 95139808 A

(51) Int. Cl.
*G02F 1/1333* (2006.01)
*G02F 1/1335* (2006.01)

(52) U.S. Cl. ................. 349/65; 349/58; 349/62; 349/64; 349/67

(58) Field of Classification Search .............. 349/58–62, 349/64–67
See application file for complete search history.

(56) References Cited

U.S. PATENT DOCUMENTS

| 6,412,969 | B1 * | 7/2002 | Torihara et al. | ............... 362/609 |
| 6,880,953 | B2 | 4/2005 | Shin | |
| 7,728,924 | B2 | 1/2010 | Cheng | |
| 2004/0263717 | A1 * | 12/2004 | Hsu et al. | ......................... 349/62 |
| 2006/0238670 | A1 * | 10/2006 | Fu et al. | ........................... 349/65 |
| 2007/0230216 | A1 * | 10/2007 | Ite et al. | ........................ 362/620 |

FOREIGN PATENT DOCUMENTS

| CN | 1371018 A | 9/2002 |
| JP | 2004-53682 A | 2/2004 |
| TW | 200819846 A | 5/2008 |

* cited by examiner

*Primary Examiner* — Julie-Huyen L Ngo
(74) *Attorney, Agent, or Firm* — Wei Te Chung

(57) ABSTRACT

An exemplary backlight module (11) includes a light source (17) including a lamp cover (172), at least one optical film (13, 14), a light guide plate (16), and a spacing member (168). The lamp cover includes an upper plate (173). The light guide plate includes a light incident surface (161), a light output surface (162) adjacent to the light incident surface (161). The light source is adjacent to the light incident surface. The at least one optical film is provided on the light output surface. The spacing member is provided between the at least one optical film and the upper plate of the lamp cover.

16 Claims, 4 Drawing Sheets

BACKLIGHT MODULE WITH OPTICAL FILM PROTECTOR AND LIQUID CRYSTAL DISPLAY DEVICE USING SAME

CROSS-REFERENCE TO RELATED APPLICATION

This application is related to, and claims the benefit of, a foreign priority application filed in Taiwan as Application No. 095139808 on Oct. 27, 2006. The related application is incorporated herein by reference.

FIELD OF THE INVENTION

The present invention relates to a backlight module having a spacing member that protects an optical film from becoming heated while the backlight module is operating, and to a liquid crystal display (LCD) device using the backlight module.

BACKGROUND

Liquid crystal displays (LCDs) are commonly used as display devices for compact electronic apparatuses. This is because they not only provide good quality images with little power consumption, but they also are very thin. The liquid crystal in a liquid crystal display does not emit any light itself. The liquid crystal has to be lighted by a light source so as to clearly and sharply display text and images. Thus, a backlight module is generally needed for a liquid crystal display.

Referring to FIG. 5, a typical LCD device 5 includes a liquid crystal panel 50, and a backlight unit 51 for providing uniform light for the liquid crystal panel 50. The backlight unit 51 includes a plastic frame 52, a diffusion film 53, a prism film 54, a light guide plate 56, two light sources 57, and a reflective film 58. Each light source 57 includes an elongated lamp 571 such as a cold cathode fluorescent lamp (CCFL), and a lamp cover 572 surrounding three sides of the lamp 571. The lamp cover 572 is generally U-shaped, and includes an upper plate (not labeled), a lower plate (not labeled) opposite to the upper plate, and a side plate (not labeled) perpendicularly adjoining both the upper plate and the lower plate.

The light guide plate 56 includes two light incident surfaces 561 at opposite sides thereof, a top light output surface 562 perpendicularly adjoining the two light incident surfaces 561, a bottom surface 563 perpendicularly adjoining the two light incident surfaces 561, and two other side surfaces (not labeled) perpendicularly adjoining the light output surface 562 and the bottom surface 563. The light sources 57 are disposed adjacent to the light incident surfaces 561, respectively.

Referring also to FIG. 6, the reflective film 58, the light guide plate 56, the diffusion film 53, and the prism film 54 are arranged in that order from bottom to top. A part of the upper plate and a part of the lower plate of each lamp cover 572 are attached to an edge portion of the light output surface 562 and an edge portion of the bottom surface 563, respectively. That is, the lamp covers 572 are clamped to two opposite sides of the light guide plate 56, respectively.

The prism film 54 and the diffusion film 53 are arranged on the light output surface 562, in that order from top to bottom. Edges of the two films 53, 54 are adjacent to edges of the upper plates of the lamp covers 572, respectively. The two films 53, 54 are very thin, and typically have a thickness of about 0.4 mm. When the lamps 571 work, the temperatures of the lamp covers 572 rise. Because the two films 53, 54 are very thin, they are liable to be affected by the high temperatures of the lamp covers 572 and become warped. Then when light transmits through the two films 53, 54, the display performance of the LCD device 5 is impaired.

What is needed, therefore, is a backlight module that can overcome the above-described deficiencies. What is also needed is an LCD device employing such a backlight module.

SUMMARY

In one preferred embodiment, a backlight module includes a light source including a lamp cover, at least one optical film, a light guide plate, and a spacing member. The lamp cover includes an upper plate. The light guide plate includes a light incident surface, and a light output surface adjacent to the light incident surface. The light source is adjacent to the light incident surface. The at least one optical film is provided on the light output surface. The spacing member is provided between the at least one optical film and the upper plate of the lamp cover.

Other novel features and advantages will become more apparent from the following detailed description of preferred embodiments when taken in conjunction with the accompanying drawings. In the drawings, all the views are schematic.

DETAILED DESCRIPTION OF PREFERRED EMBODIMENTS

Reference will now be made to the drawings to describe the preferred embodiments in detail.

Figure 1:
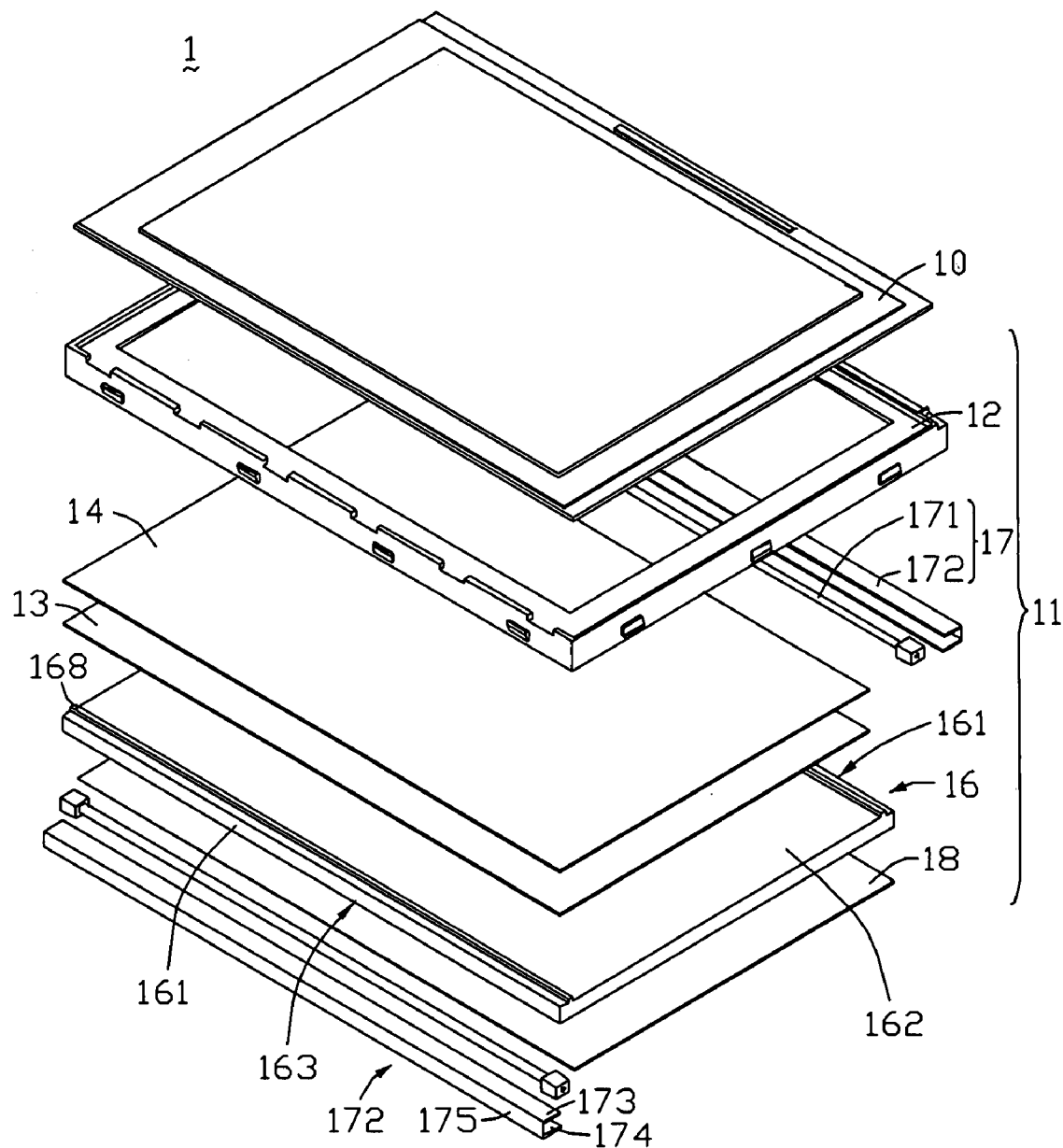
FIG. 1 is an exploded, isometric view of a liquid crystal display (LCD) device according to a first embodiment of the present invention.

Referring to FIG. 1, a liquid crystal display (LCD) device 1 according to a first embodiment of the present invention is shown. The LCD device includes a liquid crystal panel 10, and a backlight module 11 for providing uniform light for the liquid crystal panel 10. The backlight module 11 includes a plastic frame 12, a diffusion film 13, a prism film 14, a light guide plate 16, two light sources 17, and a reflective film 18. Each light source 17 includes an elongated lamp 171 such as a cold cathode fluorescent lamp (CCFL), and a lamp cover 172. The lamp cover 172 surrounds three sides of the lamp 171. The lamp cover 172 is generally U-shaped, and includes an upper wall 173, a lower wall 174 opposite to the upper wall 173, and a side wall 175 perpendicularly adjoining both the upper wall 173 and the lower wall 174.

The light guide plate 16 includes two light incident surfaces 161 at opposite sides thereof, a top light output surface 162 perpendicularly adjoining the two light incident surfaces 161, a bottom surface 163 perpendicularly adjoining the two light incident surfaces 161, and two other side surfaces (not labeled) perpendicularly adjoining the light output surface 162 and the bottom surface 163. The two light sources 17 are disposed adjacent to the two light incident surfaces 161, respectively.

Two strip-shaped of protrusions 168 are formed at two opposite side edge portions of the light output surface 162 near the two light incident surfaces 161, respectively. The protrusions 168 are parallel to each other and parallel to the lamps 171. A transverse sectional shape of each protrusion 168 can be a rectangle.

Figure 2:
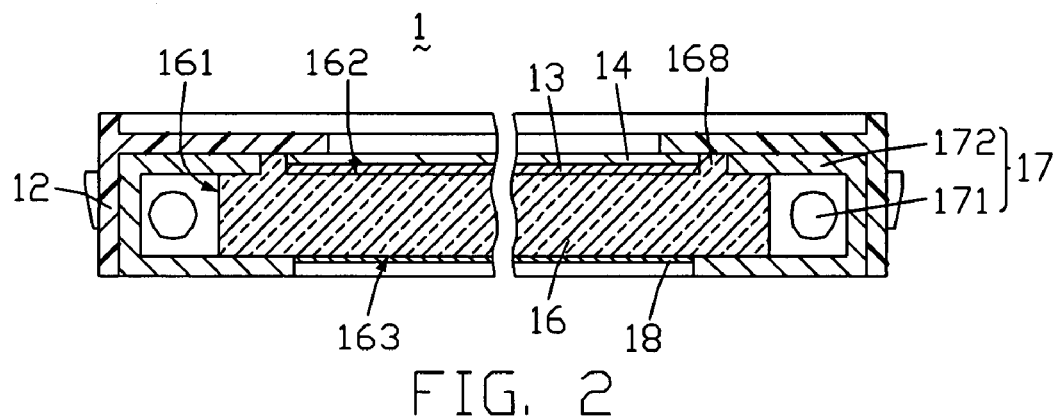
FIG. 2 is an abbreviated, side cross-sectional view of the liquid crystal display device of FIG. 1 once it is assembled.

Referring also to FIG. 2, the plastic frame 12 defines a space to accommodate the reflective film 18, the light guide plate 16, the diffusion film 13, and the prism film 14, in that order from bottom to top. The two light sources 17 are also accommodated in the space, adjacent to the two light incident surfaces 161 of the light guide plate 16 respectively. A part of the upper wall 173 and a part of the lower wall 174 of each lamp cover 172 are attached to the corresponding side edge portion of the light output surface 162 and an edge portion of the bottom surface 163, respectively. That is, the lamp covers 172 are clamped to the two opposite sides of the light guide plate 16 corresponding to the two light incident surfaces 161.

Free edges of the two upper walls 173 abut or are attached to outer surfaces of the two protrusions 168, respectively. Lateral edges of each of the two films 13, 14 abut or are attached to inner surfaces of the two protrusions 168, respectively. Thus, the upper walls 173 are separated from the two films 13, 14 by the two protrusions 168 on the light output surface 162, respectively.

When the LCD device 1 is in use and the lamps 171 are working, the lamps 171 may become quite hot and heat up the lamp covers 172. Nevertheless, unlike with a conventional LCD device, the light guide plate 16 includes the two protrusions 168 that separate the upper walls 173 of the two lamp covers 172 from the two films 13, 14. Thus, the two films 13, 14 are not affected by high temperatures of the lamp covers 172. That is, the two films 13, 14 do not warp. Accordingly, the display performance of the LCD device 1 is unimpaired.

Figure 3:
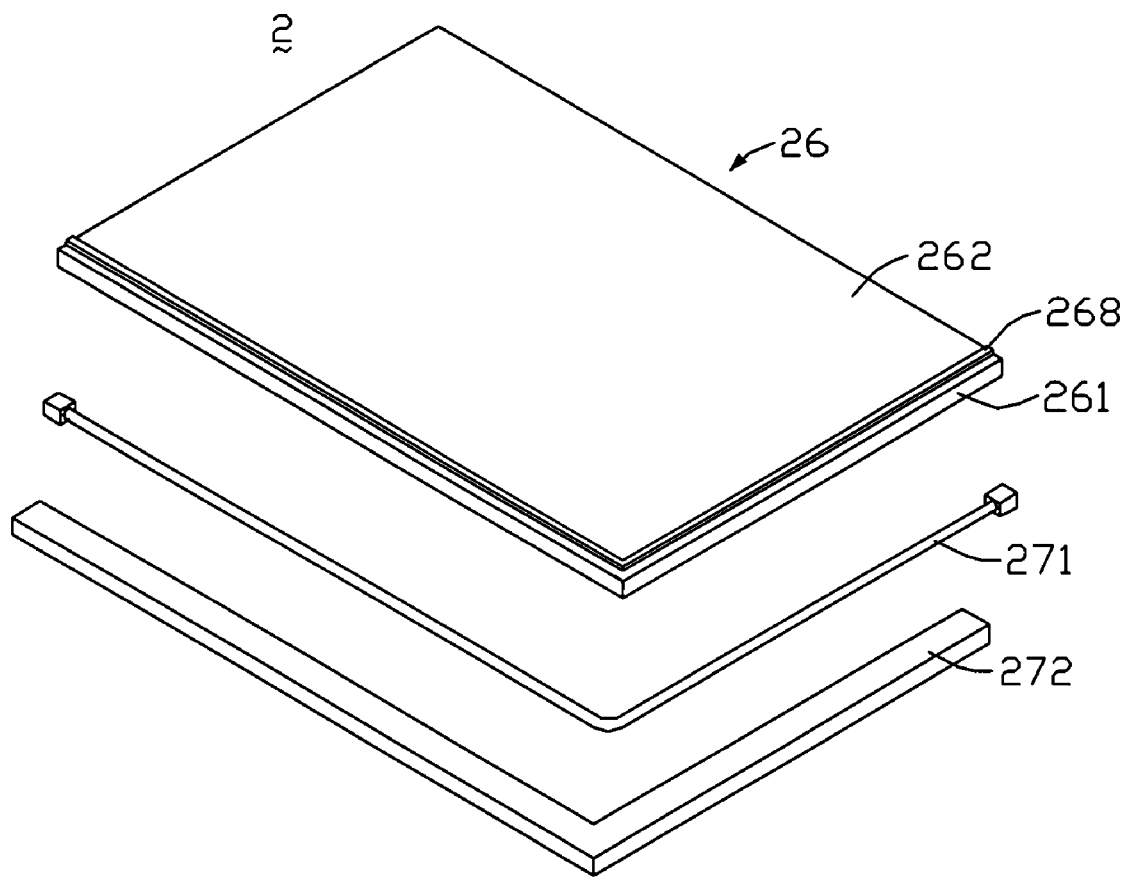
FIG. 3 is an exploded, isometric view of certain parts of a liquid crystal display device according to a second embodiment of the present invention.

Referring to FIG. 3, an LCD device 2 according to a second embodiment of the present invention is similar to the LCD device 1. However, the LCD device 2 includes an L-shaped lamp 271, a corresponding L-shaped lamp cover 272, and a light guide plate 26. The light guide plate 26 has a light output surface 262, and two adjacent light incident surfaces 261 corresponding to the L-shaped lamp 271. The light output surface 262 has an L-shaped, strip-shaped protrusion 268 formed thereon, corresponding to the two adjacent light incident surfaces 261. The L-shaped protrusion 268 also corresponds to the L-shaped lamp cover 272.

Figure 4:
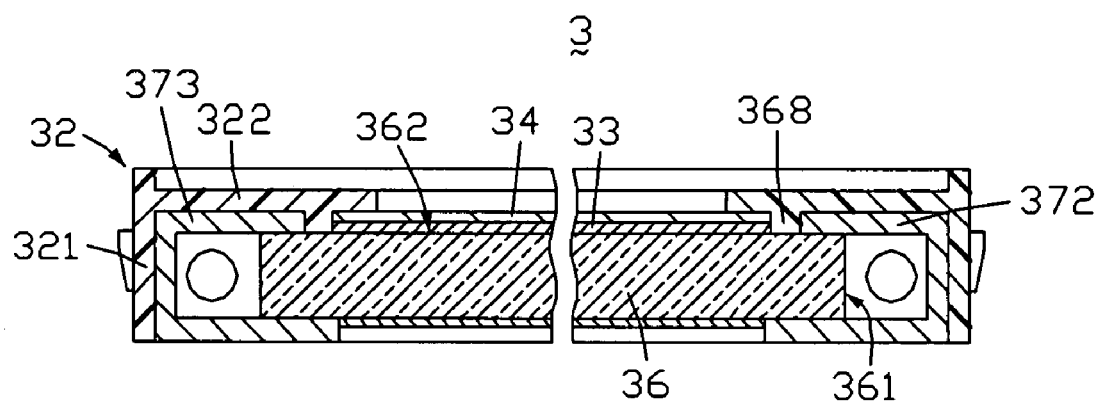
FIG. 4 is an abbreviated, side cross-sectional view of a liquid crystal display device according to a third embodiment of the present invention.
Figure 5:
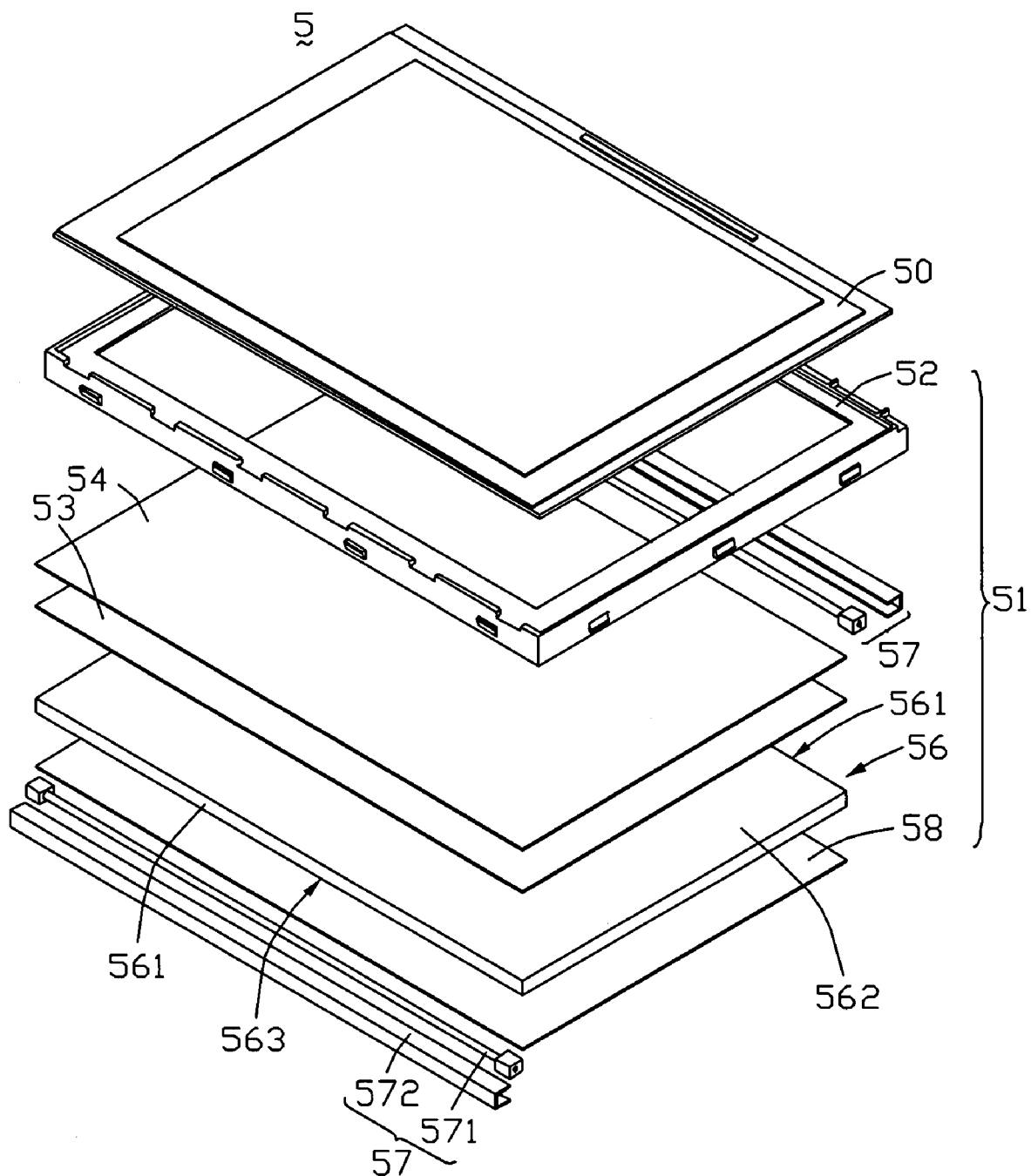
FIG. 5 is an exploded, isometric view of a conventional liquid crystal display device.
Figure 6:
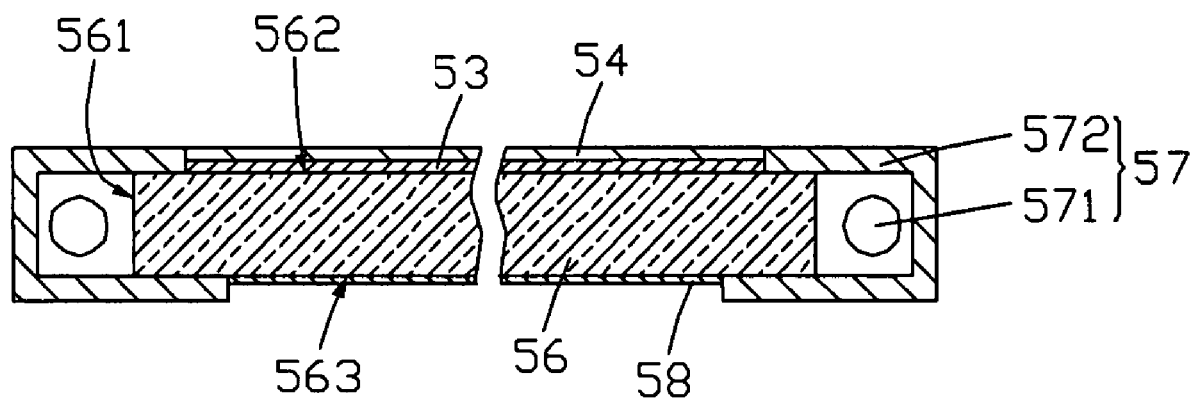
FIG. 6 is an abbreviated, side cross-sectional view of the liquid crystal display device of FIG. 5 once it is assembled.

Referring to FIG. 4, an LCD device 3 according to a third embodiment of the present invention is similar to the LCD device 1. However, a plastic frame 32 includes four side walls 321 and two spacing plates 322. The four side walls 321 are arranged end-to-end. The two spacing plates 322 perpendicularly extend from inner surfaces of two opposite side walls 321. The two spacing plates 322 correspond to two light incident surfaces 361 of a light guide plate 36. Each spacing plate 322 has a strip-shaped protrusion 368 formed on a lower surface thereof facing toward the light guide plate 36.

When the LCD device 3 is assembled, the two protrusions 368 abut or are attached to a light output surface 362 of the light guide plate 36. Free edges of two upper plates 373 of two lamp covers 372 abut or are attached to outer surfaces of the two protrusions 368, respectively. Lateral edges of two films 33, 34 abut or are attached to inner surfaces of the two protrusions 368, respectively. Thus, the upper plates 373 are separated from the two films 33, 34 by the two protrusions 368 of spacing plates 322.

Further or alternative embodiments may include the following. In one example, each protrusion 168 can be a discrete piece that is attached on the light output surface 162. In another example, a transverse sectional shape of each protrusion 168 can be a semicircle.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A backlight module comprising:
a light source comprising a lamp cover, the lamp cover comprising an upper plate;
a light guide plate comprising a light incident surface and a light output surface adjacent to the light incident surface, the light source being adjacent to the light incident surface;
at least one optical film provided on the light output surface; and
a spacing member provided between the at least one optical film and the upper plate of the lamp cover.

2. The backlight module as claimed in claim 1, wherein the spacing member perpendicularly extends from the light output surface of the light guide plate, the spacing member and the light guide plate being portions of a one-piece body.

3. The backlight module as claimed in claim 2, wherein the spacing member is elongate, and a transverse sectional shape of the spacing member is a rectangle.

4. The backlight module as claimed in claim 2, wherein the spacing member is elongate, and a transverse sectional shape of the spacing member is a semicircle.

5. The backlight module as claimed in claim 2, wherin the spacing member is disposed along a side of the light guide plate which is adjacent to the light incident surface.

6. The backlight module as claimed in claim 5, wherin the spacing member seperates the upper plate of the lamp cover from the at least one optical film.

7. The backlight module as claimed in claim 1, wherein the lamp cover is generally L-shaped.

8. The backlight module as claimed in claim 7, wherein the spacing member is generally L-shaped, and perpendicularly extends from the light output surface corresponding to the lamp cover, the spacing member and the light guide plate being portions of a one-piece body.

9. The backlight module as claimed in claim 1, further comprising a plastic frame, the frame accommodating the light guide plate, the at least one optical film on the light guide plate, and the light source adjacent to the light incident surface.

10. A liquid crystal display device comprising:
a liquid crystal display panel; and
a backlight module positioned for providing uniform light for the liquid crystal display panel, the backlight module comprising:
a light source comprising a lamp cover, the lamp cover comprising an upper plate;
a light guide plate comprising a light incident surface and a light output surface adjacent to the light incident surface, the light source being adjacent to the light incident surface;
at least one optical film provided on the light output surface; and
a spacing member provided between the at least one optical film and the upper plate of the lamp cover.

11. The liquid crystal display device as claimed in claim 10, wherein the spacing member perpendicularly extends from the light output surface of the light guide plate, the spacing member and the light guide plate being portions of a one-piece body.

12. The liquid crystal display device as claimed in claim 11, wherein the spacing member is elongate, and a transverse sectional shape of the spacing member is a rectangle.

13. The liquid crystal display device as claimed in claim 11, wherein the spacing member is elongate, and a transverse sectional shape of the spacing member is a semicircle.

14. The liquid crystal display device as claimed in claim 10, wherein the lamp cover is generally L-shaped.

15. The liquid crystal display device as claimed in claim 14, wherein the spacing member is generally L-shaped, and perpendicularly extends from the light output surface corresponding to the lamp cover, the spacing member and the light guide plate being portions of a one-piece body.

16. The liquid crystal display device as claimed in claim 10, further comprising a plastic frame, the frame accommodating the light guide plate, the at least one optical film on the light guide plate, and the light source adjacent to the light incident surface.

* * * * *